Aug. 16, 1949.  D. MURPHY  2,479,178
SEAL FOR CENTRIFUGAL PUMPS
Filed Sept. 27, 1944  2 Sheets-Sheet 1

INVENTOR
Daniel Murphy
by Christy, Parmelee and Strickland
his attorneys

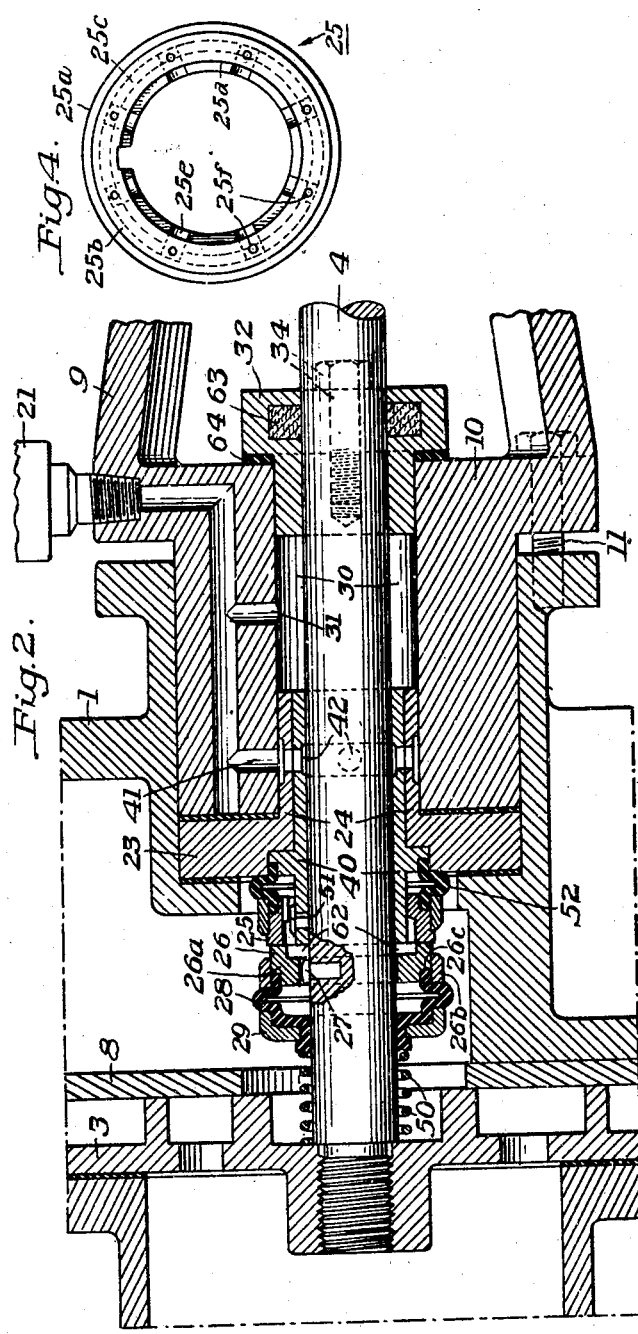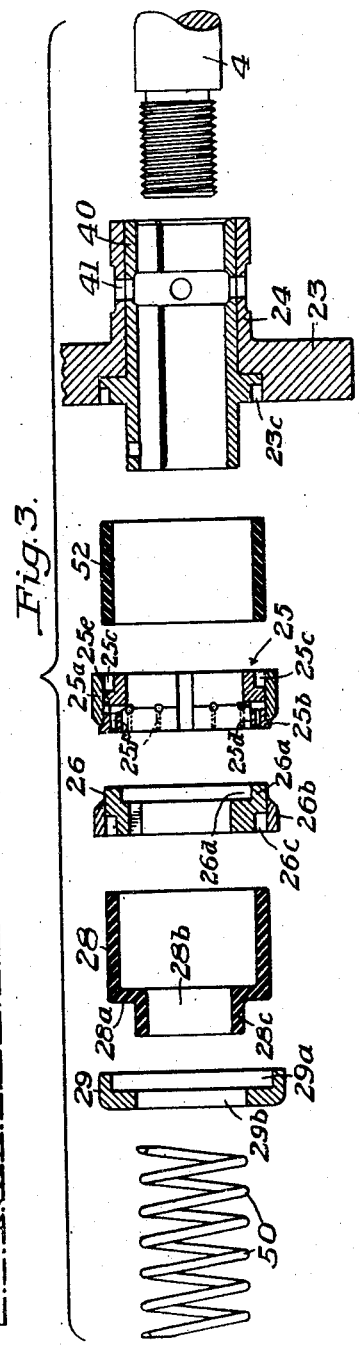

Patented Aug. 16, 1949

2,479,178

UNITED STATES PATENT OFFICE 2,479,178

SEAL FOR CENTRIFUGAL PUMPS

Daniel Murphy, New Castle, Pa.

Application September 27, 1944, Serial No. 555,925

6 Claims. (Cl. 286—11)

My invention relates to rotary pumps, and consists in means for sealing such pumps against the escape or infiltration of fluid between the rotating shaft of the pump and the pump body portion or wall through which the shaft extends.

In Letters Patent of the United States, No. 2,251,020, granted to me August 8, 1944, I have disclosed a pump that has enjoyed success in pumping "slip" in the pottery industry, and in an application for Letters Patent Serial No. 521,771, filed February 10, 1944, now Patent No. 2,453,249, issued November 9, 1948, I have illustrated and described in association with such a pump a device for sealing the rotating pump shaft to the stationary walls of the pump through which the shaft extends. More particularly, my present invention consists in certain new and useful improvements in such sealing device, whereby the device becomes yet more efficient, as is desired in those installations in which the wear on the pump bearings is particularly severe.

The invention will be understood upon reference to the accompanying drawings, in which:

Figure 2 is a fragmentary view partly in side elevation and partly in vertical section, showing the structure of an exemplary sealing device and adjacent parts of the pump to larger scale;

Figure 3 is an "exploded" view, showing the several elements of the sealing device before assembly; and Figure 4 is a front elevation of one of the elements of the sealing device.

Figure 1:
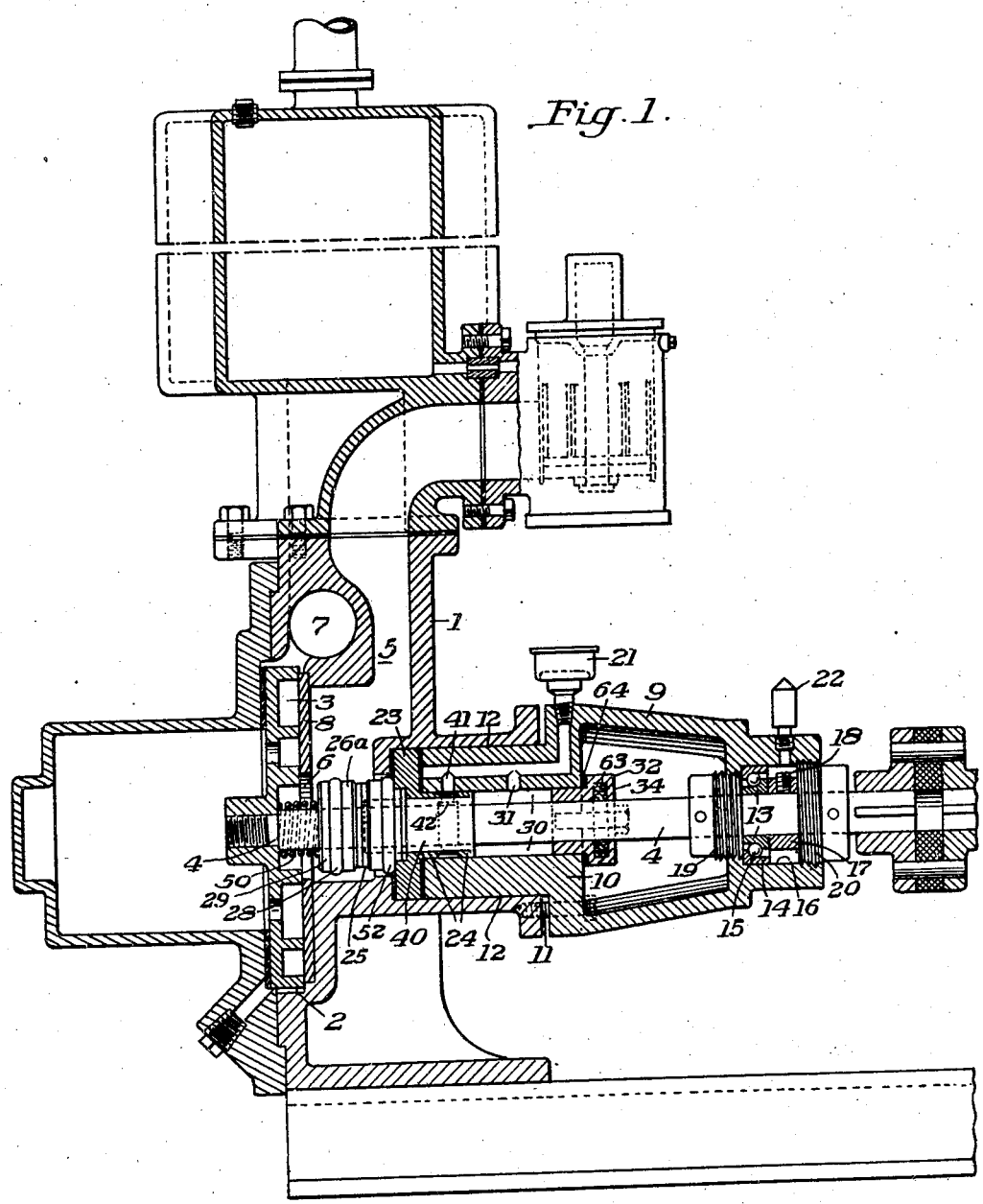
Figure 1 is a view, partly in side elevation and partly in vertical section, of a pump in which a sealing device embodying the invention is organized.

The pump shown in the drawings comprises a body 1, within which is formed the usual impeller chamber 2, and within the chamber a vaned impeller 3 is borne upon a rotary shaft 4. Under the influence of the rotating impeller, liquid is drawn from an intake passage 5 through the eye 6 of the pump, and is delivered at the periphery of chamber 2 to a discharge passage 7. When the pump is in operation, the pressure upon the delivery side, exerted upon the rotating impeller, holds the impeller under pressure in abutment upon the side wall on the right (as seen in Figure 1) of the pump chamber 2. This side wall is advantageously formed as a removable and replaceable plate 8.

The body 1 of the pump carries rigidy mounted upon it a housing 9; and within the housing two bearings are formed, which carry rotatably the shaft 4 of the impeller. The shaft 4 at its outer end (to the right, Figure 1) is adapted to be coupled to or otherwise brought into power-transmitting connection with a suitable motor; and the mounting of the shaft in said two spaced-apart bearings is effective to prevent whipping of the shaft when the pump is in operation.

One of the bearings includes an annular block 10, conveniently made in one piece with the housing 9; and the block 10, together with the integral housing, is secured by set-screws 11 in a cylindrical seat 12, formed exteriorly upon the body 1 of the pump. The other bearing consists of concentric rings 13 and 14 with rolling members, here shown to be balls 15, arranged in the race formed for them by and between the rings. The inner ring 13 fits snugly upon the shaft 4; the outer fits snugly within, and is adapted to slide longitudinally within, a bore 16 formed in the housing 9. The bearing 13, 14, 15 abuts laterally upon a ring 17, that, by means of a set-screw 18, is secured to the shaft 4. The assembly of bearing and ring is held between two nuts 19 and 20, that, encircling the shaft 4 and movable freely along shaft 4, make screw-thread engagement with the bore 16. The housing 9 is made in the form of a cage, as shown, to afford access to the inner nut 19, for adjusting it.

Means are provided for lubricating the two bearings, and conventional means are here shown, consisting of lubricant cups 21 and 22, with ducts leading to the bearing surfaces.

It will be seen that in the second bearing (the bearing to the right), and particularly in the ring 17 and the co-operating nuts 19 and 20, means are found for adjusting the shaft 4 longitudinally, in compensation for wear of the impeller 3 upon the plate 8.

It is requisite that provision be made against withdrawal of lubricant from the bearings by the suction of the operating pump, and against ingress to the bearings, when the pump is at rest, of the liquid that is pumped, a supply of which remains standing in passageway 5. In the means to such end, and in the structural organization of such means with associate parts, the improvements of my present invention are found.

In the seating of the bearing block 10 in the body 1 of the pump an annular shaft-encircling plate 23 is, by the screws 11, clamped to place at the left-hand end (Figure 1) of the cylindrical seat 12. This annular plate is provided with a sleeve-like extension 24. The extension is in this case integral with the plate itself. The plate 23 with its sleeve-like extension 24, when clamped to place, constitutes within block 10 the bearing member proper. The extension 24 carries interiorly a bronze bushing 40, within which the shaft turns. Lubrication ducts are indicated at 41, 42. The annular plate is clamped with sealing effect to the wall of the pump casing, and its integral sleeve-like extension is the immediate bearing member for the shaft; and, accordingly, I term the member 23, with its shaft-encompassing portion 24, the inner bearing and sealing member.

In the assembly the plate 23 with its sleeve-like extension 24 snugly encircles the shaft. The fit is, however, not so snug as to exert any restraint upon the free turning of the shaft within the sleeve. The central bore through the bearing block 10 is of sufficiently larger diameter to form a packing gland for the shaft in its bearing block 10. In the cylindrical space formed by and between the shaft and the block 10, and closed to the left by the plate 23 with its extension 24, is a chamber 30 that normally is filled with a supply of lubricating grease from passage 31. The chamber 30 is at its outer end closed by a block 32 having a sleeve-like extension 33 that is adjustably anchored in the bearing block 10 by setscrews 34. The block 32 includes within its outer end a channel in which a felt packing 63 is contained, and between the block and the body 10 of the bearing a rubber gasket 64 is clamped, thus preventing the escape of grease outward from chamber 30.

A sealing device cooperates with the shaft-encompassing member 23 to prevent liquid from being sucked into the pump from the bearing structure when the pump is in operation, and to prevent liquid from draining from the pump into the bearing structure when the pump is at rest. The sealing device comprises a collar portion 26 keyed, as at 27, to the shaft 4. The collar portion is thus made to rotate with the shaft, while being adapted to slide on the shaft to maintain, as presently will appear, snug contact with a non-rotating wearing member 25.

Organized with the collar portion or member 26 is a tubular member 28 formed of flexible and elastic material that is resistant to deterioration under the effects of either the liquid being pumped or the lubricant used in the bearing structure. A synthetic rubber known on the market as "neoprene" has been found to be a suitable material of which to form the member 28, but it will be understood that the invention is not predicated upon the selection of the particular material which may be used. Important characteristics of the member 28 are that it is mounted in shaft-encircling position; that at one end of its tubular or ring-like body it is secured in sealed union to the collar portion 26, and at opposite end is secured in sealed union to the shaft, or to a portion that is united to the shaft in such way that the effect is the same; that it (still referring to the member 28) is adapted to rotate in unison with the shaft and the collar portion 26; and that it is adapted to permit axial movemet of the said collar portion on the shaft without breaking the sealed unions mentioned. Preferably, if not essentially, the elastic body of the member 28 is so organized in the assembly that it operates to press and maintain the collar portion 26, in snug "running" contact with the face of the wearing member 25, whereby a sealed engagement of the relatively rotatable portions 25 and 26 is maintained both when the pump is in operation and when it is idle. The member 28, by virtue of its physical nature, is adapted to maintain such sealed engagement even though a slight misalignment exists between the relatively rotatable parts.

The member 28 may take the form of a cylindrical sleeve, shown in Figure 3, and the collar member 26, herein shown to be formed of a steel portion 26a and a brass portion 26b united in a drift fit, includes a circular slot 26c that in assembly receives the right-hand edge of the sleeve 28. At its left-hand end the sleeve is provided with a wall 28a having a circular opening 28b through which the impeller shaft 4 extends. Cooperating with the left-hand end of the sleeve is a collar member or disk 29 that is recessed, as at 29a, to receive and support the left-hand end of the sleeve. The member 29 includes an orifice 29b that peripherally engages a flange portion 28c formed integrally at the edge of the opening 28b in the sleeve, and this flange, when the parts are assembled on the shaft 4, extends through the orifice in the disk member 29, and is engaged by a compressed helical spring 50. The proportions and dimensions of the several elements of the sealing device are such that, when the elements are assembled in service positions, the body of the impeller, screwed into place on the threaded end of the shaft, compresses the spring 50; under the pressure of the spring 50 against the flange portion 28c on the shaft-encircling sleeve member 28, the flange portion is caused to bulge outward over the edge of the orifice in member 29 and from a fluid-tight seal between such member and the shaft. Under the urging of the spring 50, the disk member 29 also moves to the right, effecting the outward bulging of the elastic, cylindrical body of the member 28. As the impeller reaches fully screwed-on position, the parts are arranged as they are shown in Figure 2. The outward bulging of the cylindrical body of the member 28 causes such body to press tightly against and to envelop or overlap the outer groove-defining peripheral edge of the circular slot 26c formed in collar member 26, whereby a fluid-tight seal between the member 26 and the right-hand end of the member 28 is provided. The spring 50, disk member 29, flexible member 28, and collar member 26 all rotate in unison with the impeller shaft. While a helical spring may be provided within the member 28 on the shaft 4, and compressed between members 26 and 29, I have found that the inherent resilience or elasticity of the axially compressed body of the member 28 provides adequate thrust to press and hold the collar member 26 in fluid-tight engagement with the face of the shaft-encompassing wearing member 25. There is a slight clearance between the collar member 26 and the shaft 4, so that the collar may wobble in the event that there is any misalignment of the rotating parts, and thus tend to maintain tight contact with the wearing member 25. However, if there is substantial wear of the bearings, or if the bearings as originally provided have a running tolerance substantially more than one thousandth of an inch, the lateral play of the shaft may in time result in unequal wear between the collar member and the wearing member, with the result that leakage will develop. It is in contravention of this undesirable consequence that the wearing member 25 is formed separately from the bearing portion 23, and, while sealed to such bearing portion, is adapted to wobble sympathetically with the collar member 26 and thereby maintain the desired fluid-tight engagement in spite of any misalignment of the rotating parts.

As shown in the drawings, the member 25 comprises a two-piece structure; that is, a brass ring 25a within which is secured a ring 25b of bearing material, in this case cast iron. The ring 25b at its left-hand end extends from the ring portion 25a and provides a face against which the collar member 26 bears. The bushing or sleeve portion 40 is extended from the stationary bearing portion 23 to receive the wearing or seal member 25 in a loose fit, and a slot-and-key device 51 secures the wearing member against rotation, while permitting to required degree axial and angular movements of the wearing member relatively to the stationary bearing portion. The wearing member is sealed to the stationary bearing portion by means of a sealing element 52 of the same general sort as the sealing element 28 already described, with the following qualification: Whereas the element 28 is cup shaped, the element 52 is here shown as a plain cylindrical tube which is adapted at its two circumferential edges to be inserted in annular grooves 25c and 23c formed respectively in the wearing member 25 and the bearing portion 23. When the seal-forming parts are assembled upon the impeller shaft in the order in which they are shown in Figure 3, and the impeller 3 is screwed on the threaded end of the shaft, the parts are yieldingly urged into the assembled position shown in Figure 2. Not only is the sealing element 28 axially compressed as described above, but the sealing element 52 is similarly compressed, causing its body to be outwardly bulged between the members 25 and 23 and to envelop the outer edges of the grooves 25c and 23c with fluid-tight engagement.

Provision is made for lubricating the contacting faces of the members 25 and 26. Advantageously, the bore of the member 25 is enlarged for a part of its extent as indicated at 25d in Figure 3, to provide when assembly has been made, Figure 3, a chamber 62 for a supply of lubricating grease. Indeed, the bore in the inner ring 26a of the collar member 26 may be complementarily enlarged as shown at 26d to increase the capacity of such chamber. Within the body of the inner ring 25b of the wearing member, a plurality of pockets 25e is formed, the pockets extending radially from the enlarged bore portion 25d and being located at points spaced apart circumferentially of the member 25. And from each of said bores 25e a small passage 25f leads to the face of the wearing member that makes contact with the collar 26. The pockets 25e are in this case ⅛ inch in diameter—the passages 1/16 inch, and the mouth of each passage is countersunk to eliminate sharp edges on the face that receives the face of the rotating collar member 26.

When making assembly of the sealing device, the chamber 62 and the bores and passages 25e and 25f are packed with lubricating grease, and when the pump is in operation this grease works its way to the meeting faces of the relatively rotating members 25 and 26 and lubricates them.

The lubricant supplied through the passages 31 and 41 may be forced under pressure applied by manipulation of the grease cup 21, between the shaft 4 and the bushing 40 and into the chamber 62, to replenish the supply of lubricant as needed. In fact, not only is the chamber 62 thus charged, but the spaces within the sealing members 28 and 52 may be also filled, to serve as reservoirs of lubricant.

The bores and passages 25e and 25f have a second utility. They function to augment the dissipation of the heat generated by the friction between the faces of the rotating collar member 26 and the non-rotating member 25. But for the heat dissipation thus obtained, the effective life of the seal would be impaired; that is, no matter how efficient the lubrication is substantial heat tends to develop and endanger the life of the rubber sealing members 28 and 52. The augmented dissipation of heat provided by the feature described eliminates this danger.

The structure described affords an exemplary embodiment of my invention. The spring 50 yieldingly maintains the axially aligned series of seal-forming members in cooperative relation, and within the series the resilience of the compressed sealing elements 28 and 52 are effective to the same end. In fact, the resilience of the compressed sealing elements alone may in many cases be adequate, so that the spring 50 may be replaced by a tubular sleeve, as shown in my copending application above noted. It will further be understood that the sealing element 28 may be of the same general cylindrical form as the element 52, and cooperating members 26 and 29 appropriately modified in structure, as is also illustrated and described in my said copending application.

It will be perceived that I have sealed the passage of the pump shaft through the wall of the pump against leakage, by means of a simple organization, and that I have provided bearing for the pump shaft that is easily assembled and separated. As in course of operation the wearing plate 8 and the impeller 3 are worn away, they may readily be removed and replaced, and that as operation continues the adjustment nuts 19 and 20 constitute means for compensating for the wear.

It is to be remarked of the sealing device described that the wearing member 25 is mounted independently of the shaft 4 on the stationary extension of the bushing 40 that carries the shaft load within the bearing member 23, and, while being secured by key 51 against rotation, the member 25 is assembled with a loose fit, whereby it is free to "float" and to wobble in all directions required to obtain self-alignment with the associated rotating parts. The bushing 40 extends from the bearing member 23 a sufficient distance to provide ample support for the floating wearing and sealing member 25, and it will be noted that the flexible bellows-like organization of the member 52 allows the member 25 to move away from member 23 to maintain contact with collar 26 without breaking the seal. At the same time the flexible bellows-like member 28 with equal pressure urges the floating collar 26 into self-aligning contact with member 25. Thus, the members 29, 28, 26, 25 and 52 comprise a "floating" seal that is yieldingly held in assembly between the stationary member 23, and the spring 50 that rotates with the shaft 4. The engagement of the edge of member 28 in groove 26c seals the member 28 to the outer edge of the collar 26, whereby maximum flexibility and self-aligning activity of the parts are obtained, it being manifest that the keyed union 27 of the collar 26 to the shaft relieves the bellows-like member 28 from torque, just as the keyed union of member 25 to bushing 40 safeguards the elastic member 52 from torque. These features of the sealing device are of particular value in rotary pumps in which end play usually develops in the impeller shaft, and the bearings sooner or later wear out of true with the shaft. It will be understood that if both sealing members 25 and 26 were mounted immediately on the shaft 4, with one member held against rotation and the other rotating with the shaft, the desired effect would not be obtained, for if the bearing ran out of true by as much as three thousandths of an inch the two contacting seal members 25 and 26 in relative rotation would chatter or repeatedly hit at two points spaced 180° apart with respect to the axis of the shaft, and thus would form an opening between such members that would destroy the seal and cause leakage. This I have discovered by experience, and the objection is eliminated in the structure of my present invention.

After a prolonged and adequate period of service, it may develop, as in any piece of machinery whose parts are subject to wear, that the seal members will require renewal. In my structure this may be accomplished without tearing down the pump. It is necessary only to disconnect the coupling of the shaft 4 to its driving motor, and then remove the housing 9 from the shaft and the pump body 1. Access to the sealing device is thereby afforded. And in case a leak should develop in the sealing device at a time when it is inconvenient to make immediate repair, the block 32 may be removed, and packing placed in the chamber 30. Then the block may be reassembled and tightened against the packing. In this fashion the pump may be operated until such time as the sealing device can be renewed.

The sealing device described will prove useful in many apparatus, other than pumps, in which it is desirable to seal a rotating shaft against the escape of fluid, and within the scope of the appended claims such varied utility of the sealing device, as well as many variations and modifications in the structure of the device, are held in contemplation.

I claim as my invention:

1. In a pump comprising a pump body, a rotary shaft extending into said body, and a pump impeller in said body mounted on said shaft, the invention herein described in means for sealing the pump against the flow of fluid between the shaft and the pump body comprising a stationary shaft-engaging sleeve portion carried by said pump body, a sleeve-encompassing seal member secured against rotation upon said stationary sleeve portion and arranged for axial movement relatively thereto, a collar portion secured to rotate with said shaft and bearing with sealing contact on said seal member, and a seal element having a flexible shaft-encircling body secured in sealed union both to said shaft and to said collar portion.

2. In a pump comprising a pump body, a rotary shaft extending into said body, and a pump impeller in said body mounted on said shaft, the invention herein described in means for sealing the pump against the flow of fluid between the shaft and the pump body comprising a stationary shaft-engaging sleeve portion carried by said pump body, a sleeve-encompassing seal member secured against rotation upon said stationary sleeve portion and arranged for axial movement relatively thereto, a collar portion movable axially of and rotatable with said shaft and bearing with sealing contact against said seal member, and a tubular seal element on said shaft, said seal element having an elastic shaft-encircling body secured in sealed union both to said shaft and to said collar portion.

3. In a pump comprising a pump body, a rotary shaft extending into said body, and a pump impeller in said body mounted on said shaft, the invention herein described in means for sealing the pump against the flow of fluid between the shaft and the pump body comprising a stationary shaft-engaging sleeve portion carried by said pump body, a sleeve-encompassing seal member secured against rotation upon said stationary sleeve portion and arranged for axial movement relatively thereto, a member secured to rotate with said shaft and arranged to bear with sealing contact against said seal member, a second member mounted on said shaft to rotate therewith, and a seal element having a flexible shaft-encircling body secured in sealed union to both of said members that rotate with the shaft.

4. A sealing device for a shaft comprising a shaft-encompassing collar having an annular shaft-encircling groove therein, an elastic sealing member having a shaft-encircling edge lodged in said groove, and means for compressing said elastic sealing member axially of said shaft, the body of the sealing member being bulged sharply outward beyond the outer groove-defining circumferential edge of said groove and into overlapped fluid-tight engagement with such edge, and a non-rotating seal member encompassing said shaft and receiving said shaft-encompassing collar in substantially fluid-tight contact.

5. A sealing device for a shaft comprising a stationary shaft-engaging sleeve portion, a non-rotating seal member mounted telescopically upon said sleeve portion and movable axially of the shaft on said sleeve portion, a collar portion secured to rotate with said shaft and movable axially thereof into sealing contact with said non-rotating seal member, and means rotatable in unison with the shaft for sealing said axially movable collar portion to said shaft.

6. A sealing device for a shaft comprising a pump body having a stationary shaft-engaging sleeve portion, a non-rotating seal member mounted on said sleeve portion and movable axially thereof, a shaft-encircling groove formed in said seal member, means for sealing said seal member to said pump body comprising an elastic sealing member having a shaft-encircling edge lodged in said groove, a collar portion secured to rotate with said shaft and movable axially thereof into contact with said seal member, said collar having an annular shaft-encircling groove, an elastic sealing member encompassing the shaft and having an annular edge lodged in the groove of said collar, and means for axially compressing said elastic sealing members, the bodies of said sealing members being radially bulged sharply outward beyond the outer groove-defining edges of said grooves with which each is assembled into overlapped fluid-tight engagement with such edges.

DANIEL MURPHY.

REFERENCES CITED

The following references are of record in the file of this patent:

UNITED STATES PATENTS

| Number | Name | Date |
|---|---|---|
| 1,826,212 | Gremminger | Oct. 6, 1931 |
| 1,864,683 | Varden | June 28, 1932 |
| 1,894,943 | Dennedy | Jan. 24, 1933 |
| 1,897,280 | Schwitzer et al. | Feb. 14, 1933 |
| 1,931,723 | Fageol | Oct. 24, 1933 |
| 2,236,902 | Haller et al. | Apr. 1, 1941 |
| 2,360,372 | Snyder | Oct. 17, 1944 |
| 2,365,065 | Frankenfield | Dec. 12, 1944 |

FOREIGN PATENTS

| Number | Country | Date |
|---|---|---|
| 164,616 | Switzerland | 1934 |
| 322,709 | Great Britain | 1929 |
| 458,262 | Great Britain | 1936 |
| 123,561 | Germany | 1901 |